(12) United States Patent
Funk et al.

(10) Patent No.: US 11,071,248 B1
(45) Date of Patent: Jul. 27, 2021

(54) MOWER WITH CUTTING DECK SUSPENDED FROM FLOOR PAN

(71) Applicant: Excel Industries, Inc., Hesston, KS (US)

(72) Inventors: Brian R. Funk, Goessel, KS (US); James A. Wright, Hesston, KS (US); Tyler A. Yost, Hesston, KS (US)

(73) Assignee: EXCEL INDUSTRIES, INC., Hesston, KS (US)

(*) Notice: Subject to any disclaimer, the term of this patent is extended or adjusted under 35 U.S.C. 154(b) by 152 days.

(21) Appl. No.: 16/112,325

(22) Filed: Aug. 24, 2018

(51) Int. Cl.
*A01D 34/74* (2006.01)
*A01D 34/66* (2006.01)
*A01D 34/64* (2006.01)
*A01D 34/81* (2006.01)
*A01D 101/00* (2006.01)

(52) U.S. Cl.
CPC ........... *A01D 34/74* (2013.01); *A01D 34/662* (2013.01); *A01D 34/81* (2013.01); *A01D 2101/00* (2013.01)

(58) Field of Classification Search
CPC ...... A01D 34/74; A01D 34/662; A01D 34/63; A01D 34/64; A01D 34/81; A01D 2101/00; A01D 2034/645; A01D 34/661; A01D 34/866
See application file for complete search history.

(56) References Cited

U.S. PATENT DOCUMENTS

| | | | | |
|---|---|---|---|---|
| 3,466,855 A | * | 9/1969 | Fischer | A01D 34/64 56/11.6 |
| 4,589,249 A | * | 5/1986 | Walker | A01D 43/063 56/16.6 |
| 4,869,057 A | * | 9/1989 | Siegrist | A01D 34/64 56/15.9 |
| 5,142,850 A | * | 9/1992 | Patterson | A01D 34/74 56/17.1 |
| 5,163,274 A | * | 11/1992 | Burdsall | A01D 34/74 56/14.9 |
| 5,218,814 A | * | 6/1993 | Teal | A01D 34/64 180/291 |
| 5,381,648 A | * | 1/1995 | Seegert | A01D 34/64 56/15.9 |
| 5,956,932 A | * | 9/1999 | Schmidt | A01D 34/64 56/15.6 |
| 9,591,803 B1 | * | 3/2017 | Covington | A01D 34/82 |

* cited by examiner

*Primary Examiner* — Adam J Behrens
(74) *Attorney, Agent, or Firm* — Shook, Hardy & Bacon, LLP (57) ABSTRACT

A mower may have a frame, a floor pan affixed to the frame, and a cutting deck suspended from the floor pan. A height of the cutting deck over a terrain surface may be adjustable with a lift system. The lift system may couple the cutting deck to the floor pan and move the cutting deck between a minimum height and a maximum height.

18 Claims, 6 Drawing Sheets

MOWER WITH CUTTING DECK SUSPENDED FROM FLOOR PAN

FIELD

Aspects provided relate to positioning of a cutting deck on a mower. More particularly, aspects herein relate to suspending a cutting deck from a floor pan of a mower.

BACKGROUND

At a basic level, a mower will include a frame carried on a plurality of wheels. Coupled to the frame are a plurality of systems, including, for example, a propulsion system (e.g., a hydrostatic motor), a power generation system (e.g., a gasoline engine), a cutting deck having one or more blades, among other systems, apparatuses, assemblies, and devices. Often, previous mower frames were comprised of tube steel (e.g., rectangular tube steel, square tube steel, round tube steel, etc.). Alternative to tube steel, previous mower frames have been comprised of steel formed into other geometries (e.g., C-channels, frame channel, frame rail, etc.). As used herein, the term tube steel will refer not only to rectangular, square, or round tube steel, but also to the alternative geometries referenced above, for the sake of brevity. The plurality of systems were coupled directly to the mower frame either by welding a portion of the system to the mower frame or by bolting the system to the mower frame through the tube steel.

The cutting deck height above a terrain surface has typically been adjustable. Often, a lift system will suspend the cutting deck from the mower frame and will be configured to lift the cutting deck to a plurality of predetermined heights above the terrain surface. Thus, the lift system would either bolt-on to the mower frame or a portion of the lift system would be welded to the mower frame.

Bolting-on requires forming bolt-holes through the frame (e.g., by laser cutting), which is an expensive process. The bolt-holes must extend through both sides of the frame, resulting in at least two holes being formed on either side of the frame, but more typically resulting in four holes on either side to accommodate forward and rearward connections on each side. The bolts, and other hardware, had to be long enough to extend in one side and out the opposite side of the tube steel, which required long, expensive hardware. A further disadvantage to bolting-on the cutting deck is that the bolt-holes created entrances through which moisture could penetrate the tube steel. In some cases, the bolt-holes were formed after the frame had been painted, which could compromise the integrity and/or uniformity of the paint.

Welding a separate portion to the frame and suspending the cutting deck from said separate portion was one attempt to avoid the disadvantages of bolting-on to the frame. Welding to the tube frame, however, requires a significantly more involved and more expensive manufacturing process than does bolting-on. For example, with welding, additional tooling is necessary, one or more separate processing lines are necessary, and one or more separate work stations within each processing line are necessary. Further, welding results in slow manufacturing, more angular surfaces to paint, and provides the risk of weld failure.

SUMMARY

At a high level, a mower may comprise a frame, a floor pan affixed to the frame, and a cutting deck suspended directly from the floor pan by a coupling. In some aspects, the coupling may comprise a lift system that is configured to adjust a height of the cutting deck above a terrain surface. The lift system may include a height lock that holds the cutting deck at a plurality of predetermined heights above the terrain surface. The lift system may be bolted to the floor pan, in accordance with some aspects.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other present or future technologies. Further, it should be appreciated that the figures do not necessarily represent an all-inclusive representation of the embodiments herein and may have various components hidden to aid in the written description thereof.

Aspects hereof may be described using directional terminology. For example, the Cartesian coordinate system may be used to describe positions and movement or rotation of the features described herein. Accordingly, some aspects may be described with reference to three mutually perpendicular axes. The axes may be referred to herein as lateral, longitudinal, and vertical, and may be indicated by reference characters X, Y, and Z, respectively, in the accompanying figures. For example, the terms "vertical" and "vertically" as used herein refer to a direction perpendicular to each of the lateral and longitudinal axes. Additionally, relative location terminology will be utilized herein. For example, the term "proximate" is intended to mean on, about, near, by, next to, at, and the like. Therefore, when a feature is proximate another feature, it is close in proximity but not necessarily exactly at the described location, in some aspects. Additionally, the term "distal" refers to a portion of a feature herein that is positioned away from a midpoint of the feature.

At a high level, aspects hereof relate to a mower having a frame, a floor pan affixed to the frame, and a cutting deck suspended directly from the floor pan by a coupling. The cutting deck may be coupled to the floor pan at a fixed height with non-adjustable hangars, or at an adjustable height with a lift system. In some aspects, bolt-holes may be formed through the floor pan and the hangars or lift system may be bolted-on to the floor pan. This configuration has a number of advantages, for example, floor pans are typically much thinner than tube steel, and as a result, smaller and therefore less expensive hardware may be used to secure the hangars or lift system to the floor pan. Moreover, this configuration allows the cutting deck to be suspended from the mower without the need for a separate welding process and without the need to affect the continuity of paint applied to the frame (e.g., by cutting holes through the frame) and without providing gaps that might allow moisture penetration inside the frame.

In the figures that follow, the mower will be described in reference to a particular embodiment of a zero-turn riding mower. However, the illustrated embodiment is merely one aspect of the present invention, which may be employed on numerous other types of mowers having a suspended cutting deck (e.g., a stand-on mower, a bagging mower, a non-zero turn mower, etc.).

Figure 1:
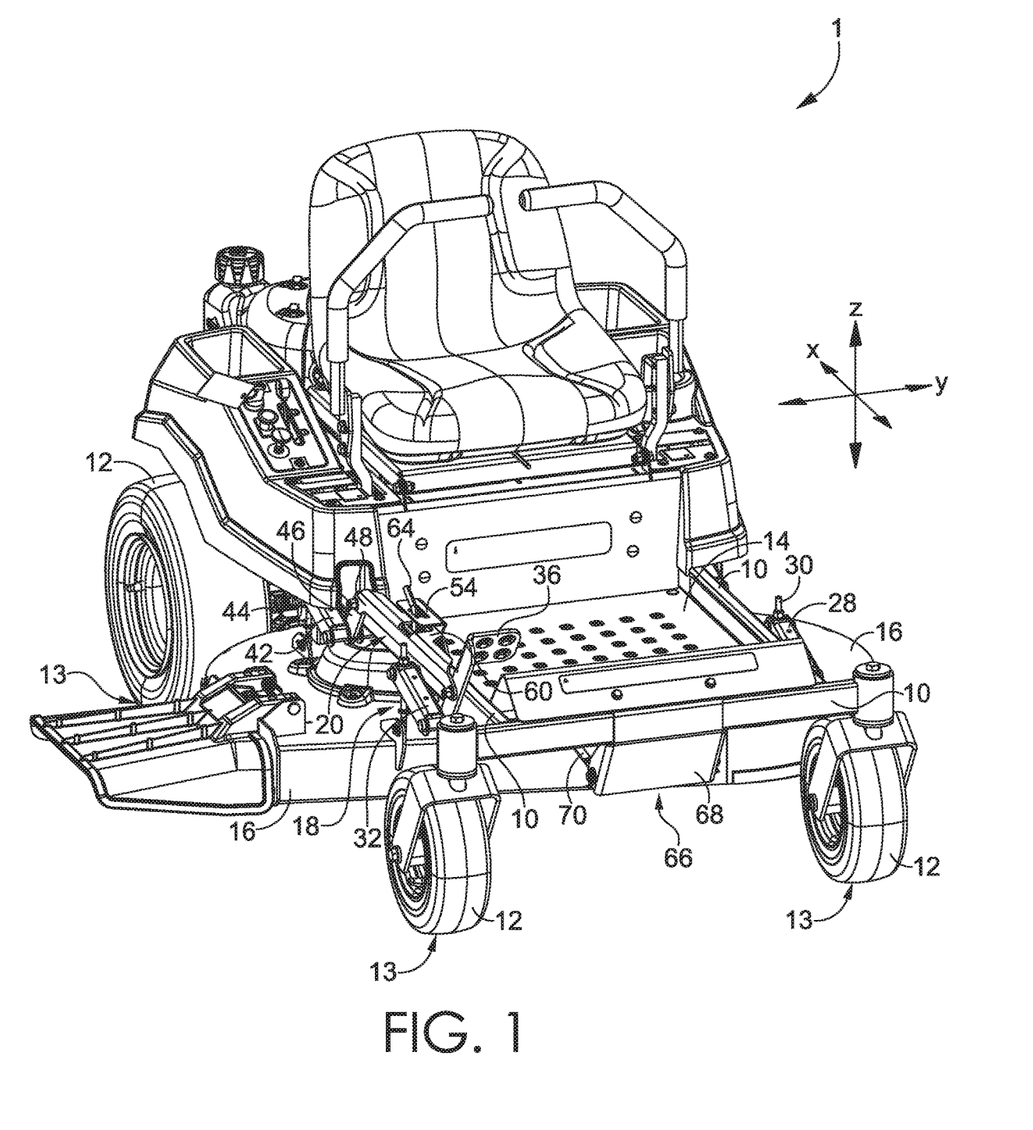
FIG. 1 depicts a perspective view of a mower having a cutting deck and a lift system, in accordance with aspects hereof.
Figure 2:
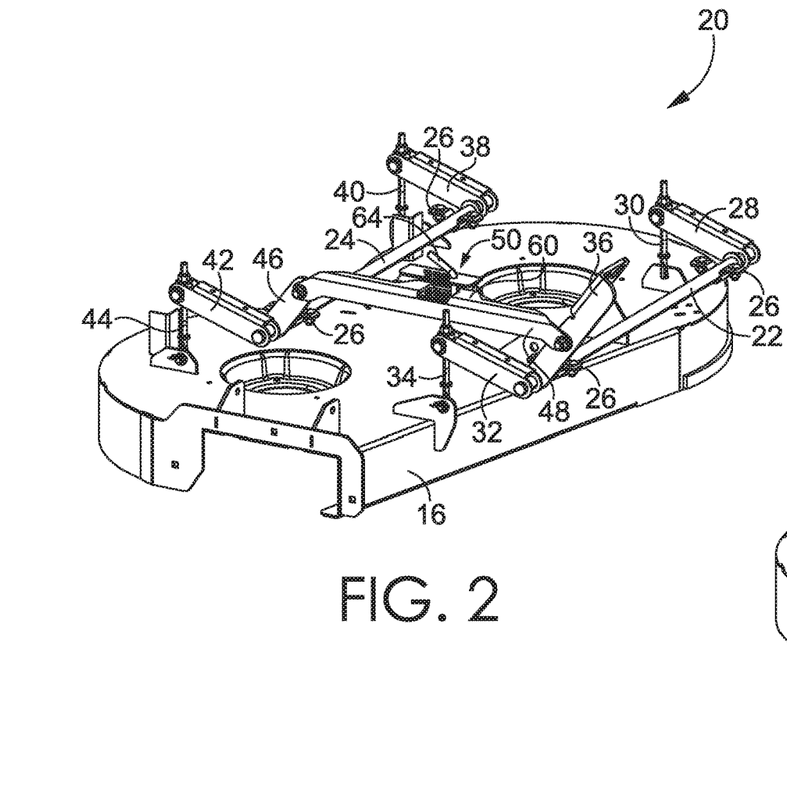
FIG. 2 depicts a perspective view of the cutting deck and the lift system of FIG. 1 in a maximum cutting height position, in accordance with aspects hereof.
Figure 3:
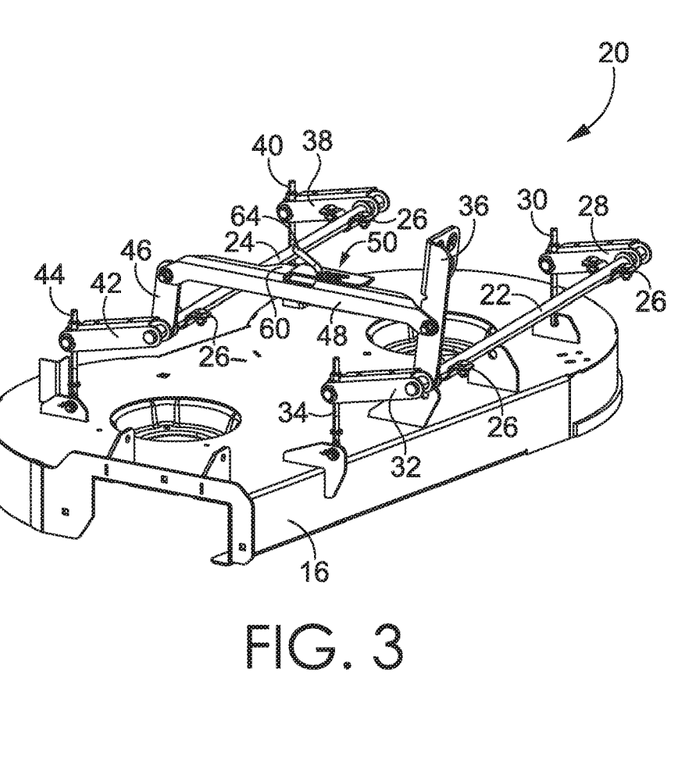
FIG. 3 depicts a perspective view of the cutting deck and the lift system of FIG. 1 in a minimum cutting height position, in accordance with aspects hereof.
Figure 4:
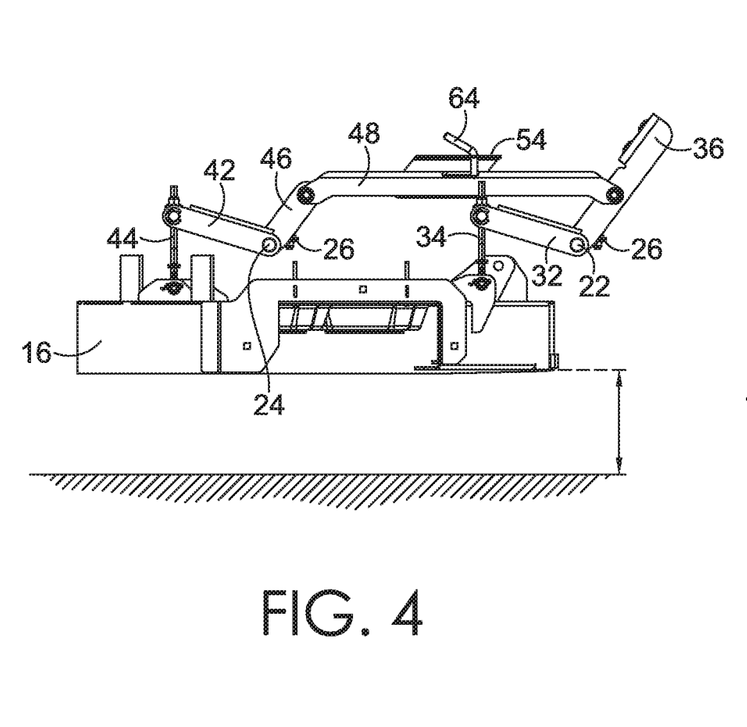
FIG. 4 depicts a side elevation view of the cutting deck and the lift system of FIG. 2 in the maximum cutting height position, in accordance with aspects hereof.
Figure 5:
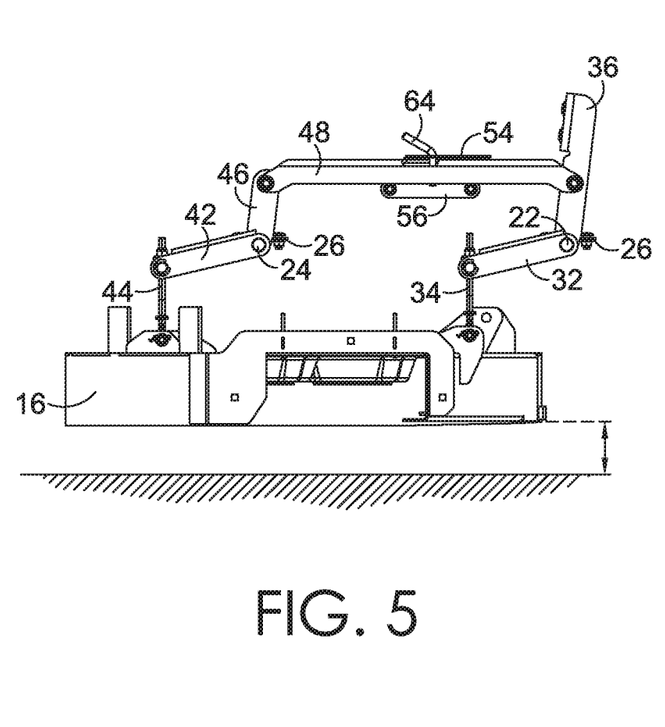
FIG. 5 depicts a side elevation view of the cutting deck and the lift system of FIG. 3 in the minimum cutting height position, in accordance with aspects hereof.

Turning now to the figures generally, and in particular to FIG. 1, a mower 1 is depicted having a frame 10 carried on a plurality of wheels 12. Each wheel of the plurality of wheels 12 may contact a terrain surface at a ground contacting surface 13. For example, the ground contacting surface 13 may be the bottom-most portion of each wheel. In some aspects, the frame 10 may comprise tube steel (e.g., rectangular, square, or round tube steel, C-channel or other alternative geometry steel, etc.). A floor pan 14 is affixed to the frame 10. The floor pan 14 may comprise a plate, a perforated sheet, a grate, or other panel that provides an operator surface, in accordance with some aspects. For example, the floor pan may comprise a steel plate. An operator may use the operator surface to stand-on when boarding or unboarding the mower 1. Further, the operator surface may be useful to carry the operator's feet during operation of the mower 1. In some aspects, the thickness of the floor pan 14 may be increased as compared with prior floor pans. For example, some prior floor pans had an eleven gauge thickness while the floor pan 14 of the present disclosure may have at least a seven gauge thickness.

The floor pan 14 may be affixed to frame 10 in many different ways. For example, the floor pan 14 may be welded to the frame 10. In some aspects, the floor pan 14 may be welded on both a top side and a bottom side to the frame 10. In other aspects, the floor pan 14 may only be welded at one of the top side or the bottom side to the frame 10, which may be advantageous from a manufacturing efficiency perspective in terms of both time and money. For example, some frames 10 may have components welded only on a single side to decrease the weld time during manufacturing. In still other aspects, the floor pan 14 may be fastened to the frame 10 with one or more fasteners. The fasteners may comprise bolts, rivets, screws, clamps, hangars, or even adhesives, in accordance with some aspects. Thus, the floor pan 14 may be releasably or non-releasably affixed to the frame 10.

The mower 1 also includes a cutting deck 16 suspended from the floor pan 14 by a coupling 18. In the illustrated aspect, the coupling 18 comprises a lift system 20. In other aspects, the coupling 18 may comprise a hangar system. For example, the hangar system may couple the cutting deck 16 to the floor pan 14 with one or more rods that couple on one end to the floor pan 14 and on an opposite end to the cutting deck 16. The hangar system may be a static system where the cutting deck 16 is fixed at a single height above a terrain surface. In contrast, the lift system 20 may be a dynamic system that comprises a linkage pivotally coupled to the floor pan 14. The linkage may pivot to provide a variable height to the cutting deck 16 above a terrain surface (for example, for making different heights of cuts or traversing over terrain having different clearances). Thus, the lift system 20 may move the cutting deck 16 between a minimum adjustable height and a maximum adjustable height. In some aspects, the lift system 20 may be configured to selectively hold the cutting deck 16 at the minimum height, the maximum height, and one or more intermediate heights between the minimum height and the maximum height. As used herein, the minimum height and/or the minimum adjustable height may refer to a shortest vertical distance at which the cutting deck 16 is above a ground contacting surface of the plurality of wheels 12. Similarly, as used herein, the maximum height and/or the maximum adjustable height may refer to a largest vertical distance at which the cutting deck 16 is above the ground contacting surface of the plurality of wheels 12. In some aspects, the position of the cutting deck 16 may be measured relative to the floor pan 14. For example, the maximum height of the cutting deck 16 above a terrain surface and/or the ground contacting surface of the plurality of wheels 12 may be associated with the cutting deck 16 being positioned at a first vertical position relative to the floor pan 14. Likewise, the minimum height of the cutting deck 16 above a terrain surface and/or the ground contacting surface of the plurality of wheels 12 may be associated with the cutting deck 16 being positioned at a second vertical position relative to the floor pan 14.

Figure 7:
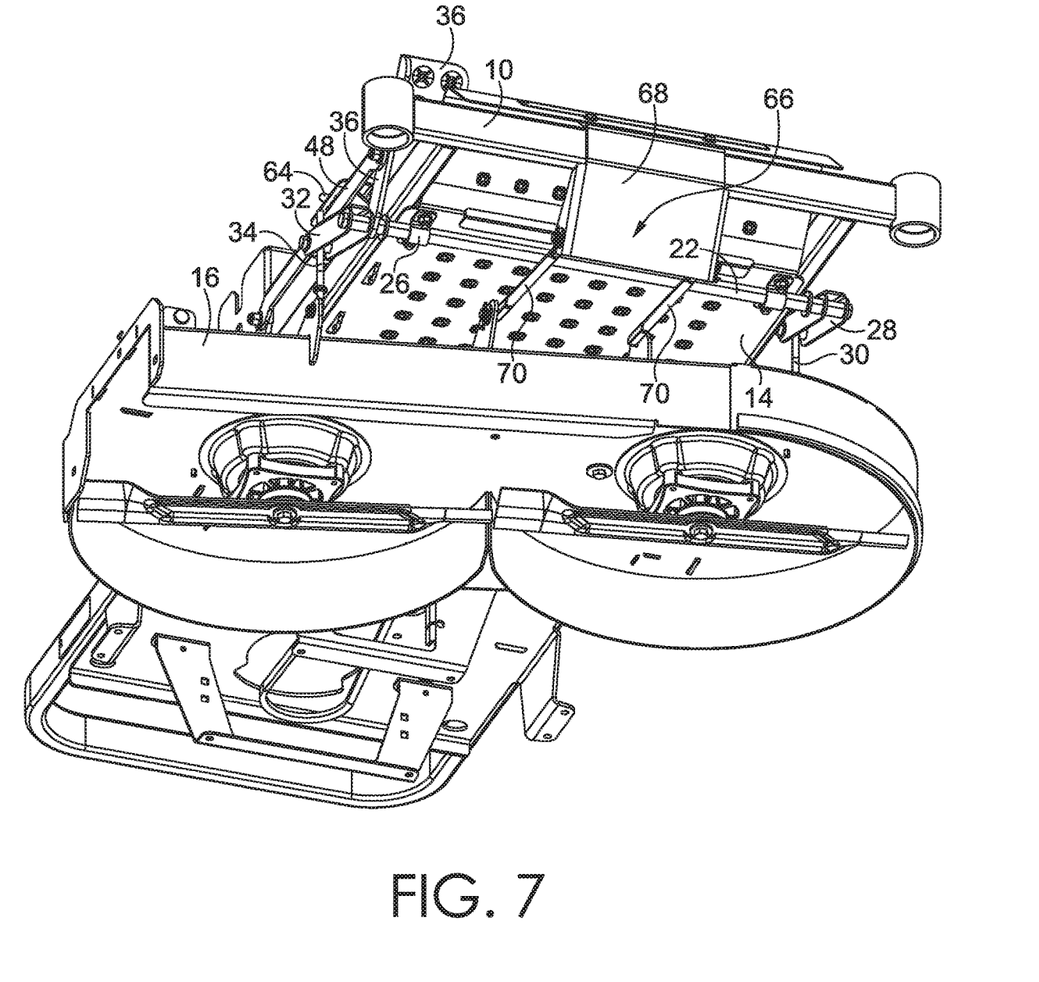
FIG. 7 depicts a perspective view of a cutting deck pulling assembly of the mower of FIG. 1, in accordance with aspects hereof.

Turning now to FIGS. 2-5, one aspect of the cutting deck 16 and lift system 20 is depicted. The lift system 20 is depicted holding the cutting deck 16 at the maximum height in FIGS. 2 and 4 and is depicted holding the cutting deck 16 at the minimum height in FIGS. 3 and 5. In other aspects, the lift system 20 may allow the cutting deck 16 to lower all the way to the terrain surface, and thus the cutting deck 16 may not have a minimum height. The illustrated aspect of the lift system 20 includes a first pivot rod 22 forward of a second pivot rod 24. The first pivot rod 22 and the second pivot rod 24 are pivotally coupled to the floor pan 14 (as seen in FIG. 7) with a plurality of rod straps 26. Some other aspects may only have a single pivot rod, while others may have more than two pivot rods. In the illustrated aspect, the plurality of rod straps 26 are bolted to the floor pan 14, however, the plurality of rod straps 26 may be otherwise fastened to the floor pan 14. In other aspects, the plurality of rod straps 26 may be welded to a bottom side of the floor pan 14. In yet other aspects, the plurality of rod straps 26 may be integrally formed in the bottom side of the floor pan 14.

A first link 28 is fixed to the first pivot rod 22 and extends radially out therefrom. The first link 28 may be positioned proximate a first end of the first pivot rod. A second link 30 is pivotally coupled to the first link 28 and extends downwardly therefrom. The second link 30 is also coupled to the cutting deck 16. Thus, rotation of the first pivot rod 22 results in a vertical position of the pivotal coupling between the first link 28 and the second link 30 moving upward or downward, which results in the height of the cutting deck 16 adjusting an equivalent amount. Similarly, a third link 32 is fixed to the first pivot rod 22 and extends radially out therefrom. The third link 32 may be positioned proximate a second end of the first pivot rod 22. A fourth link 34 is pivotally coupled to the third link 32 and extends downwardly therefrom. The fourth link 34 is also coupled to the cutting deck 16. In some aspects, the second link 30 and the fourth link 34 are fixed to the cutting deck 16. In other aspects, the second link 30 and the fourth link 34 are pivotally coupled to the cutting deck 16. In yet other aspects, the lift system 20 may only have a single link pivotally coupled to a single rod, while other aspects have more than two links coupled to the first pivot rod 22. Even further aspects may have more than two links between the first pivot rod 22 and the cutting deck 16.

Rotation of the first pivot rod 22 may be achieved by manual input from the operator through a foot pedal 36. The foot pedal 36 may comprise a link fixed to the first pivot rod 22 and extending radially out therefrom, as in the illustrated aspect. In some aspects, however, rotation of the first pivot rod 22 may be powered or automated. For example, a linear actuator may extend or retract to move the foot pedal 36, and in turn rotate the first pivot rod 22. Said linear actuator may be controlled by an electrical system of the mower 1, in accordance with some aspects.

In the illustrated aspect, a similar linkage couples the second pivot rod 24 to the cutting deck 16. A fifth link 38 is fixed proximate a first end of the second pivot rod 24 and extends radially out therefrom. A sixth link 40 is pivotally coupled to the fifth link 38 and extends downwardly therefrom. The sixth link 40 is also coupled to the cutting deck 16. Thus, rotation of the second pivot rod 24 results in a vertical position of the pivotal coupling between the fifth link 38 and the sixth link 40 moving upward or downward, which results in the height of the cutting deck 16 adjusting an equivalent amount. Similarly, a seventh link 42 is fixed proximate a second end of the second pivot rod 24 and extends radially out therefrom. An eighth link 44 is pivotally coupled to the seventh link 42 and extends downwardly therefrom. The eighth link 44 is also coupled to the cutting deck 16. In some aspects, the second link 30, the fourth link 34, the sixth link 40, and the eighth link 44 may each have an adjustable length. The adjustable length may assist leveling the cutting deck 16. In other aspects, the coupling between the cutting deck 16 and each of the second link 30, the fourth link 34, the sixth link 40, and the eighth link 44 may be a pivotal coupling.

Rotation of the second pivot rod 24 may be achieved by connecting the first pivot rod 22 to the second pivot rod 24 with a drive linkage. Thus, rotation of the first pivot rod 22 may cause rotation of the second pivot rod 24. In the illustrated aspect, the drive linkage comprises a following link 46 and a drive link 48. The following link 46 is fixed to the second pivot rod 24 and extends radially out therefrom. The drive link 48 is pivotally coupled on a first end to the foot pedal 36 and pivotally coupled on a second end to the following link 46. Thus, input to the foot pedal 36 not only causes rotation of the first pivot rod 22, but also rotation of the second pivot rod 24. In other aspects, the first pivot rod 22 and the second pivot rod 24 may be independently rotated. For example, a second liner actuator may extend or retract to move the following link 46, and in turn, rotate the second pivot rod 24.

As described, the lift system 20 comprises a parallel linkage. That is, the first link 28, the third link 32, the fifth link 38, and the seventh link 40 each extend in parallel and maintain this parallel alignment as the first pivot rod 22 and the second pivot rod 24 rotate. Similarly, the pedal link 36 and the following link 46 are illustrated as extending in parallel. While the lift system 20 is depicted as a parallel linkage, this need not be the case. For example, the links may be of different lengths and set at different angles. However, using a parallel linkage may be advantageous for manufacturing purposes and/or ease of operation purposes. Similarly, the first pivot rod 22 and the second pivot rod 24 are illustrated as parallel to one another. Again, this configuration may be advantageous for manufacturing and/or ease of operation, but it is not always required.

In accordance with other aspects, the lift system 20 may comprise other vertical actuation systems. For example, a hydraulic cylinder may couple the cutting deck 16 to the floor pan 14 and extension of the piston may determine the height of the cutting deck 16. Or, other linear actuators oriented in the vertical direction associated with the mower 1 may couple the cutting deck 16 to the floor pan 14 and determine the height of the cutting deck 16 by extension or retraction.

After the first pivot rod 22 and second pivot rod 24 have been rotated to a position corresponding to a desired cutting deck 16 height, it is desirable to temporarily prevent further rotation. Rotation of the first pivot rod 22 and the second pivot rod 24 may be prevented in a number of ways. First, gravity will hold the cutting deck 16 in the minimum height position until a force overcoming gravity is applied to the pedal link 36. Second, an operator may hold the pedal link 36 at a desired position. Third, a height lock 50 may be engaged to lock the linkage and the cutting deck 16 in a desired position. Fourth, an electrically controlled linear actuator may hold the pedal link 36 at a desired position.

The height lock 50 may comprise any device or assembly that prevents movement of any link described above. In the illustrated aspect shown in FIGS. 6A and 6B, the height lock 50 comprises a plate 52 affixed to the frame 10 on one side of the mower 1 and extending vertically therefrom. An upper lock plate 54 and a lower lock plate 56 are coupled to the plate 52 (e.g., bolted-on). The upper lock plate 54 and the lower lock plate 56 may each have an 'L' shaped cross-section, such that they each have a vertical portion that couples with the plate 52 and a horizontal portion that projects laterally outward.

Figures 6A, 6B:
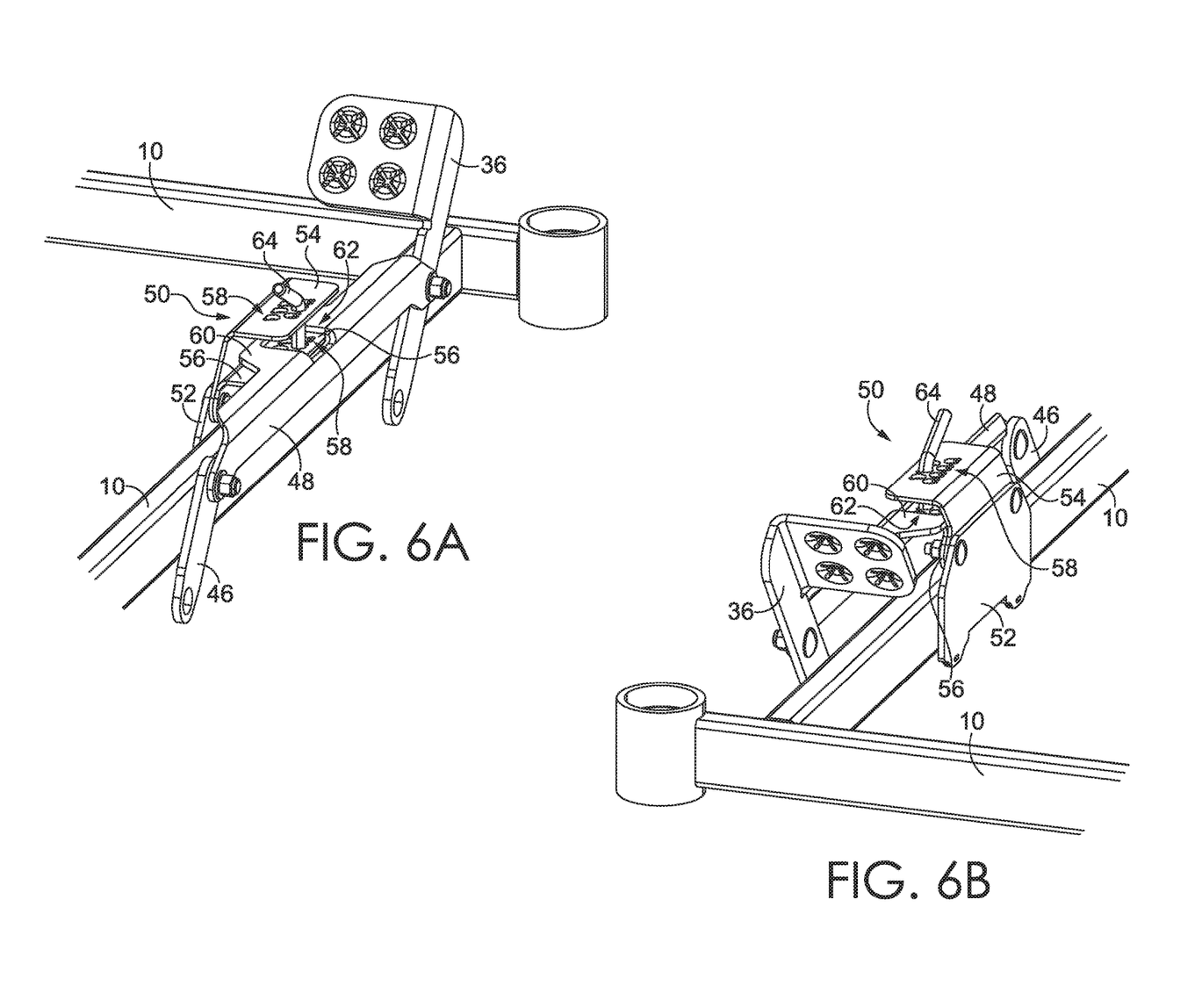
FIG. 6A depicts a detail view of a height lock system of the mower of FIG. 1, in accordance with aspects hereof.
FIG. 6B depicts a detail view of a height lock system of the mower of FIG. 1, in accordance with aspects hereof.

Each of the upper lock plate 54 and the lower lock plate 56 include a plurality of apertures 58 formed in the horizontal portion. The plurality of apertures 58 formed in the upper locking plate 54 are aligned with the plurality of apertures 58 formed in the lower locking plate. Thus, each aperture of the plurality of apertures 58 formed in the upper lock plate 54 has a corresponding aperture in the lower lock plate 56. For example, a first pair of apertures may be associated with the cutting deck 16 positioned at the minimum height and a second pair of apertures may be associated with the cutting deck 16 positioned at the maximum height. A plurality of pairs of apertures associated with a plurality of intermediate heights may be positioned between the first pair of apertures and the second pair of apertures.

The drive link 48 has a flange 60 that extends laterally inward. The flange 60 includes an opening 62. A locking pin 64 may be inserted through any one or pair of apertures of the plurality of apertures 58 and through the opening 62 to selectively hold the linkage at a selected position and set a height of the cutting deck 16 above a terrain surface. In other aspects, rather than the flange 60, a separate link may extend laterally from the drive link 48 to engage the locking pin 64 at a selected position. Further, any mechanical interference between the drive link and a pin or other obstruction is contemplated.

Turning now to FIG. 7, the illustrated aspect of the mower 1 further comprises a cutting deck pulling assembly 66. The cutting deck pulling assembly 66 includes a mounting plate 68 affixed to the frame 10 (e.g., welded, fastened, etc.) and extending downwardly and optionally rearwardly therefrom. A pair of pulling links 70 are pivotally coupled to the mounting plate 68 on a first end and pivotally coupled to the cutting deck 16 on a second end. The cutting deck pulling assembly 66 pulls the cutting deck across the terrain driven upon in the longitudinal direction of the mower 1. Having the pulling assembly 66 provide a longitudinal force to the cutting deck 16 is advantageous because the lift system 20 need not be as robust as it might be if it were also responsible for transmitting the longitudinal force of the cutting deck 16 to the frame 10. For example, the links 28, 30, 32, 34, 36, 38, 40, 42, and 44 coupled to the pivot rods 22 and 24 may be smaller in size, and therefore less expensive, as a result of the pulling assembly 66.

In some aspects, the cutting deck pulling assembly 66 may carry a portion of the weight of the cutting deck 16. However, in comparison to a portion of the weight of the cutting deck 16 carried by the floor pan 14, the portion of the weight of the cutting deck 16 carried by the cutting deck pulling assembly 66 is de minimus.

Figure 8:
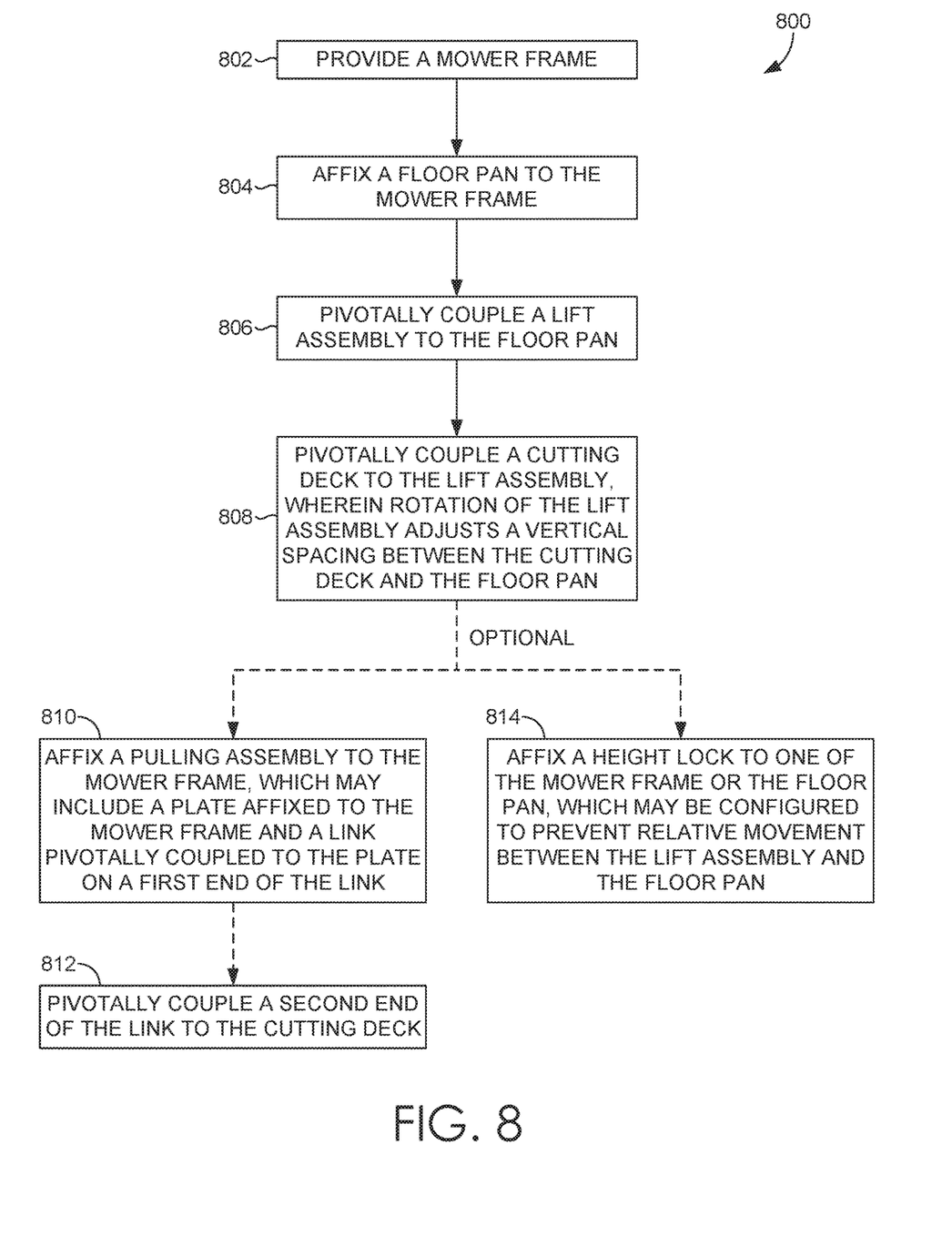
FIG. 8 depicts a flow diagram illustrating a method of mounting a cutting deck to a mower, in accordance with aspects hereof.

Referring to FIG. 8, a method 800 of mounting a cutting deck to a mower is depicted. Initially, the method 800 involves providing a mower frame, as depicted in block 802. A floor pan is affixed to the mower frame, as depicted in block 804. A lift assembly is pivotally coupled to the floor pan, as depicted in block 806. A cutting deck is pivotally coupled to the lift assembly, as depicted in block 808. Rotation of the lift assembly may adjust a vertical spacing between the cutting deck and the floor pan.

In some aspects, the method 800 may also include the step of affixing a pulling assembly to the mower frame, as depicted in block 810. The pulling assembly may include a plate affixed to the mower frame and a link pivotally coupled to the plate on a first end of the link. A second end of the link may be pivotally coupled to the cutting deck, as depicted in block 812.

In other aspects, the method 800 may further include the step of affixing a height lock to one of the mower frame or the floor pan, as depicted in block 814. The height lock may be configured to prevent relative movement between the lift assembly and the floor pan.

In further aspects, the step of pivotally coupling a lift assembly to the floor pan may include the following steps. A first opening and a second opening may be formed in the floor pan. A rod of the lift assembly may be hung from a bottom side of the floor pan with a rod strap. The rod strap may permit rotational movement of the rod relative to the floor pan. The axis of the rod may be parallel to the floor pan. The rod strap may be fastened to the floor pan through the first opening and the second opening.

Some aspects of this disclosure have been described with respect to the illustrative examples provided by FIGS. 1-8. Additional aspects of the disclosure will now be described that may be related to subject matter included in one or more claims of this application, or one or more related applications, but the claims are not limited to only the subject matter described in the below portions of this description. These additional aspects may include features illustrated by FIGS. 1-8, features not illustrated by FIGS. 1-8, and any combination thereof. When describing these additional aspects, reference may or may not be made to elements depicted by FIGS. 1-8.

One aspect disclosed herein is directed to a mower. The mower may include a frame, a floor pan coupled to the frame, and a cutting deck coupled to the floor pan. In some aspects, the frame may comprise rectangular tubing. In other aspects, the floor pan may comprise a plate welded to a forward end of the frame. A vertical position of the cutting deck relative to the floor pan may be adjustable, in accordance with aspects hereof. For example, the cutting deck may be coupled to the floor pan by a lift assembly configured to adjust the vertical position of the cutting deck relative to the floor pan. In still other aspects, the mower may also include a cutting deck pulling assembly affixed to the frame and pivotally coupled to the cutting deck. In further aspects, the cutting deck pulling assembly may include a plate welded to a forward end of the frame, and a pair of pulling links, each link of the pair of pulling links having a first end pivotally coupled to the plate and a second end pivotally coupled to the cutting deck. In yet other aspects, the cutting deck may include a plurality of cutting blades. In some aspect, the cutting deck may be positioned below the floor pan and above a terrain surface driven upon by the mower.

Another aspect disclosed herein is directed to a lift assembly for adjusting a vertical position of a mower cutting deck suspended from a floor pan of a mower. The lift assembly may include a first pivot rod rotatably coupled to the floor pan, a first link fixedly coupled to the first pivot rod, a first suspension rod pivotally coupled to the first link, the first suspension rod coupled to the cutting deck, and a pedal link fixedly coupled to the first pivot rod for rotating the first pivot rod between a first position and a second position, wherein the first position is associated with a minimum vertical position of the cutting deck, wherein the second position is associated with a maximum vertical position of the cutting deck.

In some aspects, the lift assembly may also include a second link fixedly coupled to the first pivot rod, and a second suspension rod pivotally coupled to the second link, the second suspension rod coupled to the cutting deck. The first link may be coupled proximate a first end of the first pivot rod, and the second link may be coupled proximate a second end of the first pivot rod. In further aspects, the lift assembly may also include a second pivot rod rotatably coupled to the floor pan, the second pivot rod having a third link fixedly coupled to a first end of the second pivot rod and a fourth link fixedly coupled to a second end of the second pivot rod, a third suspension rod pivotally coupled to the third link, the third suspension rod coupled to the cutting deck, a fourth suspension rod pivotally coupled to the fourth link, the fourth suspension rod coupled to the cutting deck, and a drive linkage configured to rotate the second pivot rod in conjunction with rotation of the first pivot rod.

In other aspects, the drive linkage may include a following link fixedly coupled to the second pivot rod and a drive link pivotally coupled on a first end to the following link and pivotally coupled on a second end to the pedal link. In even further aspects, the lift assembly may include a height lock configured for retaining the first pivot rod in one of the first position, the second position, or an intermediate position between the first position and the second position. In aspects, the height lock may include a first plate coupled to the frame at a position proximate the drive link, a second plate coupled to the frame at proximate to, and spaced apart from, the first plate, a first plurality of openings formed through the first plate, a second plurality of openings formed through the second plate, the drive link having an aperture formed therein, wherein the first plurality of openings are aligned with the second plurality of openings, and a pin extending through one of the first plurality of openings, the aperture, and one of the second plurality of openings. In yet other aspects, the first pivot rod may be rotatably coupled to the floor pan on a bottom side of the floor pan.

Another aspect disclosed herein is directed to a method of mounting a cutting deck to a mower. The method may include the steps of providing a mower frame, affixing a floor pan to the mower frame, pivotally coupling a lift assembly to the floor pan, and pivotally coupling a cutting deck to the lift assembly, wherein rotation of the lift assembly adjusts a vertical spacing between the cutting deck and the floor pan.

In some aspects, the method may also include the steps of affixing a pulling assembly to the mower frame, the pulling assembly having a plate affixed to the mower frame and a link pivotally coupled to the plate on a first end of the link and pivotally coupling a second end of the link to the cutting deck. In other aspects, the method may also include the step of affixing a height lock to one of the mower frame or the floor pan, wherein the height lock is configured to prevent relative movement between the lift assembly and the floor pan. In still other aspects, pivotally coupling a lift assembly to the floor pan includes the steps of forming a first opening and a second opening in the floor pan, hanging a rod of the lift assembly from a bottom side of the floor pan with a rod strap, wherein the rod strap permits rotational movement of the rod relative to the floor pan, wherein the axis of the rod is parallel to the floor pan, and fastening the rod strap to the floor pan through the first opening and the second opening.

Additionally, although some exemplary implementations of the embodiments described herein are shown in the accompanying figures, these implementations are not intended to be limiting. Rather, it should be understood that the various embodiments and aspects described herein may be implemented upon any mower having a cutting deck suspended therefrom.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

What is claimed:

1. A mower comprising:
    a frame comprising a first rail associated with a first side of the mower and a second rail associated with a second side of the mower;
    a floor pan having a bottom planar surface, the floor pan being coupled to the frame and extending between the first rail and the second rail; and
    a cutting deck suspended from the floor pan, wherein a front portion of the cutting deck is suspended from the floor pan at a first coupling and a rear portion of the cutting deck is suspended from the floor pan at a second coupling,
    wherein the first coupling comprises a pivot rod rotatably coupled to the bottom planar surface of the floor pan with a rod strap.

2. The mower of claim 1, wherein the floor pan comprises a plate welded to a forward end of the frame.

3. The mower of claim 2, wherein the plate has at least a seven gauge thickness.

4. The mower of claim 1, wherein a vertical position of the cutting deck relative to the floor pan is adjustable.

5. The mower of claim 4, wherein the cutting deck is coupled to the floor pan by a lift assembly configured to adjust the vertical position of the cutting deck relative to the floor pan.

6. The mower of claim 1 further comprising a cutting deck pulling assembly affixed to the frame and pivotally coupled to the cutting deck.

7. The mower of claim 6, wherein the cutting deck pulling assembly comprises:
    a plate welded to a forward end of the frame; and
    a pair of pulling links, each link of the pair of pulling links having a first end pivotally coupled to the plate and a second end pivotally coupled to the cutting deck.

8. The mower of claim 1, wherein the cutting deck includes a plurality of cutting blades.

9. The mower of claim 1, wherein the cutting deck is positioned below the floor pan and above a bottom point of at least one wheel coupled to the frame.

10. A mower comprising:
    a frame comprising a first rail associated with a first side of the mower and a second rail associated with a second side of the mower;
    a floor pan having a bottom planar surface, the floor pan being coupled to the frame and extending between the first rail and the second rail;
    a cutting deck suspended from the floor pan, wherein a front portion of the cutting deck is suspended from the floor pan at a first coupling and a rear portion of the cutting deck is suspended from the floor pan at a second coupling; and
    a third coupling comprising a cutting deck pulling assembly affixed to the frame and pivotally coupled to the front portion of the cutting deck.

11. The mower of claim 10, wherein the cutting deck pulling assembly comprises:
    a plate welded to a forward end of the frame; and
    a pair of pulling links, each link of the pair of pulling links having a first end pivotally coupled to the plate and a second end pivotally coupled to the cutting deck.

12. A mower comprising:
    a frame comprising a first rail associated with a first side of the mower and a second rail associated with a second side of the mower;
    a floor pan having a bottom planar surface, the floor pan being coupled to the frame and extending between the first rail and the second rail; and
    a cutting deck; and
    a lift assembly having a forward pivot rod and a rear pivot rod, each pivot rod rotatably coupled to the floor pan, wherein a front portion of the cutting deck is suspended from the forward pivot rod and a rear portion of the cutting deck is suspended from the rear pivot rod.

13. The mower of claim 12, wherein the forward pivot rod is rotatably coupled to the floor pan with at least one front rod strap and the rear pivot rod is rotatably coupled to the floor pan with at least one rear rod strap.

14. The mower of claim 12, wherein the lift assembly further comprises:

a front linkage coupled to the forward pivot rod and the front portion of the cutting deck; and a rear linkage coupled to the rear pivot rod and the rear portion of the cutting deck.

15. The mower of claim 14 further comprising a foot pedal operatively coupled to one of the forward pivot rod and the rear pivot rod, wherein the foot pedal is configured to cause the one of the forward pivot rod and the rear pivot rod to rotate.

16. The mower of claim 15 further comprising a following link operatively coupled to the other of the forward pivot rod and the rear pivot rod from that which the foot pedal is coupled, and a drive link coupled to the foot pedal on one end and coupled to the following link on an opposite end, wherein the drive link and the following link are configured to cause the forward pivot rod and the rear pivot rod to rotate an equal amount.

17. The mower of claim 16 further comprising a height lock for selectively retaining the forward pivot rod and the rear pivot rod in a selected position.

18. The mower of claim 17, wherein the height lock comprises:

a first plate coupled to the frame at a position proximate the drive link;

a second plate coupled to the frame at a second position proximate to, and spaced apart from, the first plate;

a first plurality of openings through the first plate and a second plurality of openings through the second plate, wherein the drive link has an aperture, wherein the first plurality of openings are aligned with the second plurality of openings; and a pin extending through one of the first plurality of openings, the aperture, and one of the second plurality of openings.

* * * * *